United States Patent
Müller et al.

(10) Patent No.: US 9,896,613 B2
(45) Date of Patent: Feb. 20, 2018

(54) ESTERS FOR DRILLING EMULSIONS AND METAL WORKING FLUIDS

(75) Inventors: Heinz Müller, Monheim (DE); Diana Mäker, Mettmann (DE); Patrick Hähnel, Duisburg (DE)

(73) Assignee: Amril AG, Zug (CH)

( * ) Notice: Subject to any disclaimer, the term of this patent is extended or adjusted under 35 U.S.C. 154(b) by 283 days.

(21) Appl. No.: 14/416,442

(22) PCT Filed: Jul. 26, 2012

(86) PCT No.: PCT/EP2012/064730
§ 371 (c)(1),
(2), (4) Date: Feb. 19, 2015

(87) PCT Pub. No.: WO2014/015911
PCT Pub. Date: Jan. 30, 2014

(65) Prior Publication Data
US 2015/0210914 A1    Jul. 30, 2015

(51) Int. Cl.
C09K 8/32 (2006.01)
C09K 8/36 (2006.01)
C09K 8/28 (2006.01)
C10M 173/02 (2006.01)
C08L 71/02 (2006.01)

(52) U.S. Cl.
CPC ............... *C09K 8/36* (2013.01); *C08L 71/02* (2013.01); *C09K 8/28* (2013.01); *C10M 173/02* (2013.01); *C10M 2207/046* (2013.01); *C10M 2207/124* (2013.01); *C10M 2207/126* (2013.01); *C10M 2207/281* (2013.01); *C10M 2209/104* (2013.01); *C10M 2209/108* (2013.01); *C10M 2215/042* (2013.01); *C10N 2230/04* (2013.01); *C10N 2230/24* (2013.01); *C10N 2240/401* (2013.01)

(58) Field of Classification Search
CPC .................................. C09K 8/26; C09K 8/36
USPC ....................................................... 507/136
See application file for complete search history.

(56) References Cited

U.S. PATENT DOCUMENTS

| | | | |
|---|---|---|---|
| 2,109,947 A | 3/1938 | North | |
| 2,661,334 A * | 12/1953 | Lummus | C09K 8/36 507/116 |
| 2,803,646 A | 8/1957 | Bell, Jr. et al. | |
| 4,766,153 A † | 8/1988 | Casciani | |
| 5,252,554 A | 10/1993 | Mueller et al. | |
| 5,403,822 A | 4/1995 | Mueller et al. | |
| 5,846,601 A | 12/1998 | Ritter et al. | |
| 5,869,434 A | 2/1999 | Mueller et al. | |
| 6,069,169 A * | 5/2000 | Ptchelintsev | A61Q 19/00 424/70.1 |
| 6,326,514 B1 | 12/2001 | Klug et al. | |
| 6,716,799 B1 | 4/2004 | Mueller et al. | |
| 6,806,235 B1 | 10/2004 | Mueller et al. | |
| 7,666,820 B2 | 2/2010 | Mueller et al. | |
| 7,741,248 B2 | 6/2010 | Mueller et al. | |
| 8,148,305 B2 | 4/2012 | Westfechtel et al. | |
| 8,153,562 B2 | 4/2012 | Muller et al. | |
| 8,193,125 B2 | 6/2012 | Muller et al. | |
| 8,236,735 B2 | 8/2012 | Maker et al. | |
| 2012/0067575 A1 | 3/2012 | Luyster et al. | |
| 2013/0289290 A1 | 10/2013 | Muller et al. | |
| 2014/0048258 A1 | 2/2014 | Muller et al. | |

FOREIGN PATENT DOCUMENTS

| | | |
|---|---|---|
| EP | 0374672 A1 | 6/1990 |
| EP | 0386636 A1 | 9/1990 |
| EP | 0642561 A1 | 3/1995 |
| EP | 0765368 A1 | 4/1997 |
| EP | 1061064 A1 | 12/2000 |
| EP | 2497844 A1 | 9/2012 |
| WO | 9323491 A1 | 11/1993 |
| WO | 9534610 A1 | 12/1995 |
| WO | 9933932 A1 | 7/1999 |

OTHER PUBLICATIONS

International Search Report dated Mar. 18, 2013 in PCT/EP2012/064730 (4 pages).

\* cited by examiner
† cited by third party

*Primary Examiner* — Aiqun Li
(74) *Attorney, Agent, or Firm* — Philip P. McCann; Smith Moore Leatherwood LLP

(57) ABSTRACT

The present invention relates to an emulsion comprising at least (a) an organic phase, (b) a water phase and (c) an ester based on an ether carboxylic acid and an alcohol. Also within the ambit of the invention is the use of an ester as defined in (c) as emulsifier, as a thickening agent and/or as an anti-foaming agent in particular in drilling emulsions and metal working fluids.

19 Claims, No Drawings

ESTERS FOR DRILLING EMULSIONS AND METAL WORKING FLUIDS

This application is a national stage application under 35 U.S.C. § 371 of International Application No. PCT/EP2012/064730 filed 26 Jul. 2012, the disclosure of which is expressly incorporated herein by reference.

The present invention relates to an emulsion comprising at least (a) an organic phase, (b) a water phase and (c) an ester based on an ether carboxylic acid and an alcohol. Also within the ambit of the invention is the use of an ester as defined in (c) as emulsifier, as thickening agent and/or as an anti-foaming agent in particular in drilling emulsions and metalworking fluids.

BACKGROUND OF THE INVENTION

Drilling fluids can be used in geotechnical engineering but also in other fields. When used in geotechnical engineering, a drilling fluid or mud is a specially designed fluid that is circulated through a wellbore as the wellbore is being drilled to facilitate the drilling operation. Drilling operations in general can concern oil and gas production or the generation of drilling holes useful in exploiting geothermal activity. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

Drilling fluids for sinking wells in rock and bringing up the rock cuttings are flowable water- or oil-based systems that are thickened to a needed extent. Oil-based systems are acquiring increasing significance in practice and are used in particular in offshore drilling operations. Oil-based drilling fluids are generally used as so-called invert emulsion muds which generally consist of a 3-phase system: oil, water and fine-particle solids. Drilling fluids such as these can be preparations of the w/o emulsion type, i.e. the aqueous phase is heterogeneously and finely dispersed in the continuous oil phase. A range of additives may be used for stabilizing the system as a whole and for establishing the required performance properties, including in particular emulsifiers and emulsifier systems, weighting agents, fluid loss additives, viscosity adjusters and optionally an alkali reserve. Further details can be found, for example, in the Article by P. A. Boyd et al., "New base oil used in low toxicity oil muds", Journal of Petroleum Technology, 1985, 137-142.

As mentioned, one key criterion for evaluating the usefulness of drilling fluids in practice are their rheological characteristics. Certain viscosity values have to be maintained in drilling fluid systems suitable for practical application. In particular, uncontrolled thickening and hence increases in the viscosity of the drilling fluid have to be strictly prevented because, otherwise, the pipe can become stuck during drilling (cf. Manual of Drilling Fluids Technology, NL Baroid/NL Inc. 1985, Chapter "Stuck Pipe") and can only be freed by expensive, time-consuming measures. In practice, therefore, suitable diluents are added to the drilling fluid systems before and also during drilling. It is known from the prior art that anionic surfactants from the group of fatty alcohol sulfates, fatty alcohol ether sulfates and alkyl benzenesulfonates are preferably used for this purpose. It has been found in practice, however, that although compounds of this type can effectively influence the rheology of the drilling fluids, problems can arise with diluents known from the prior art when drilling fluids are used at low external temperatures. This applies in particular at temperatures of 50° F. (10° C.) and lower. There is invariably an increase in viscosity which is difficult or impossible to control, even when known diluents are used.

A second key criterion for the usefulness of drilling fluids is that the fluid functions as metalworking fluid to keep the metal parts operational.

In addition, all additives and auxiliaries used in offshore and onshore drilling fluid systems are expected to satisfy stringent biodegradability and toxicity requirements. Also, the ambient conditions prevailing during drilling operations, such as high temperatures, high pressures, changes in pH caused by the inrush of acidic gases, etc., impose high demands on the choice of possible components and additives.

The choice of emulsifiers for metalworking fluids and well servicing systems and, more particularly, drilling fluids is primarily directed at finding substances which lead to maximum stability of the emulsion, even under different conditions of practical application, e.g. breaking of the emulsion should be prevented. This applies in particular to emulsions of the water-in-oil type. It is furthermore generally advantageous if an emulsifier additionally suppresses excessive foaming of the emulsion.

Previously, ether carboxylic acids were used as emulsifiers (see e.g. US 2007 049 500). For the above reasons, there is a need for novel improved emulsifiers that meet the above outlined quality requirements.

SUMMARY OF THE INVENTION

It is one object of the invention to overcome the above outlined problems. In particular it is an object of the invention to provide novel emulsifiers with improved filtrate properties and with stable rheological properties in a wide range of temperature conditions.

The present invention, thus, provides in a first aspect an emulsion comprising at least the following components:
(a) an organic phase;
(b) a water phase; and
(c) as first additive an ester based on an ether carboxylic acid and an alcohol wherein preferably said ether carboxylic acid and/or said alcohol is alkoxylated (e.g. ethoxylated and/or propoxylated).

In a further aspect the invention relates to the use of an ester as defined herein (first additive) as emulsifier, as viscosifier and/or as an anti-foaming agent in particular for use in an emulsion of the invention.

DETAILED DESCRIPTION OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As used herein an alcohol also includes alkoxylates.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety. Nothing herein is to be construed as an admission that the invention is not entitled to antedate such disclosure by virtue of prior invention.

As mentioned, the invention provides novel emulsifiers and improved emulsions, which for example tend to have better foaming properties and overall rheological properties. It is to be understood that in some embodiments the emulsion of the invention may comprise solid particles.

Thus, in a first aspect the invention provides an emulsion comprising at least the following components:
(a) an organic phase;
(b) a water phase; and
(c) as first additive an ester based on an ether carboxylic acid and an alcohol, wherein preferably said ether carboxylic acid and/or said alcohol is alkoxylated (e.g. ethoxylated and/or propoxylated).

The first additive can be prepared using routine ester production methods for example by esterification of 1 mol ethercarboxylic acid using 1 mol of the alcohol or alcohol alkoxylate, respectively. Preferred esters can be prepared for example by reacting 2 mol alcohol alkoxylate with 1 mol sodium monochloroacatate.

Preferably, said emulsion is a drilling fluid (for example used for oil or gas drilling) or a metal working fluid.

In a preferred embodiment, the emulsion further comprises
(d) as second additive an emulsifier which is different from the first additive and which can be for example an emulsifier selected from the group consisting of an ether carboxylic acid, a fatty acid amine, an amidoamine, a fatty alcohol ethoxylate, a fatty acid ethoxylate, an alkylpolyglycoside and a fatty alcohol.

Preferably, the emulsion of the invention is a water-in-oil or an oil-in-water emulsion and whereby preferably the composition comprises from 2 to 98% water and from 2 to 98% organic phase based on the volume of the emulsion. Most preferably, the emulsion of the invention is a water-in-oil emulsion, i.e. comprises a continuous oil phase. If the emulsion of the invention is a water-in-oil emulsion it comprises preferably more than 50 vol % of organic phase, more preferably at least 60 vol % and most preferably at least 70 vol % of the organic phase based on the total volume of the emulsion. If the emulsion of the invention is an oil-in-water emulsion it comprises preferably more than 50 vol % of water, more preferably at least 60 vol % and most preferably at least 70 vol % of water based on the total volume of the emulsion.

"Water phase" as used herein means water which optionally comprises one or more dissolved water soluble compound. The water is preferably present in the emulsion of the invention in quantities of at least about 0.5% by weight based on the weight of the emulsion. In a preferred embodiment, however, the invert emulsions contain between 5 and 30 wt.-% water based on the weight of the emulsion. The water in the emulsion of the type described herein preferably contains electrolytes to equalize the osmotic gradient between the drilling fluid and the formation water, calcium and/or sodium salts representing the preferred electrolytes. $CaCl_2$ in particular may be used. However, other salts from the group of alkali metals and/or alkaline earth metals, for example potassium acetates, caesium salts, bromides (such as calciumbromide) and/or formates, are also suitable.

In a further preferred embodiment, the emulsion of the invention is flowable and pumpable at least over the temperature range of between 5° and 20° C.

As mentioned, the emulsion of the invention comprises as first additive an ester based on an ether carboxylic acid and an alcohol and may additionally comprise as a second additive an ether carboxylic acid. The ether carboxylic acid mentioned in (c) and (d) may be the same or different. The average skilled person may obtain ether carboxylic acids useful for the invention either commercially or may produce preferred ether carboxylic acids as outlined in e.g. EP 1 061 064 A1, where a fatty alcohol is converted into an alcoholate, then reacted with alkylene oxides and alkylated with chloroacetic acid derivatives in the alkaline medium to form the end product.

In the context of the present invention, certain compounds such as alcohols and/or ether carboxylic acids may be alkoxylated where indicated. Preferably, said alcohol and/or ether carboxylic acid is ethoxylated and/or propoxylated. In one embodiment it may be an advantage to have both ethylene oxide and propylene oxide groups in the alcohol and/or ether carboxylic acid molecule. The order or sequence of the groups is not critical for the invention. Accordingly, respective compounds of the invention including compounds corresponding to formula (I), (II), (III), (IV) and (V) disclosed herein may contain ethylene oxide groups and/or propylene oxide groups in the order indicated or in random order (known as random alkoxylates), which may also be used. It is to be understood that if a compound of the invention is alkoxylated (e.g. ethoxylated and/or propoxylated) then this compound may also comprise multiple alkylene oxide groups covalently linked to different atoms of said compound. In one embodiment, such compounds which are multiply alkoxylated can be made by alkoxylation (e.g. ethoxylation and/or propoxylation) of respective compounds that comprise more than one hydroxyl group.

In the emulsion according to the invention the ether carboxylic acid used in (c) or (d) is preferably a compound having the general formula (I) or (II)

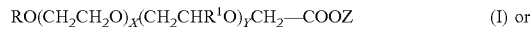

$$RO(CH_2CH_2O)_x(CH_2CHR^1O)_yCH_2\text{—}COOZ \qquad (I) \text{ or}$$

$$RO(CH_2CHR^1O)_y(CH_2CH_2O)_xCH_2\text{—}COOZ \qquad (II)$$

wherein

R is a branched or unbranched $C_6$-$C_{50}$ alkyl which may be optionally alkoxylated (e.g. ethoxylated and/or propoxylated) or substituted with one or more —COOZ substituent or R is a branched or unbranched $C_6$-$C_{50}$ alkenyl which may be optionally alkoxylated (e.g. ethoxylated and/or propoxylated) or substituted with one or more —COOZ substituent;

X is 0 or a number from 1 to 20;

Y is 0 or a number from 1 to 20;

with the proviso that the sum of X and Y is not more than 25;

$R^1$ is an alkyl group with 1 to 4 carbon atoms; and

Z comprises at least one member selected from the group consisting of a hydrogen atom, a monovalent cation and a polyvalent cation.

The type of cation that can be used is not critical. Preferred embodiments include the use of sodium, potassium and calcium cations.

Furthermore, preferred embodiments of the emulsion are characterized by the use of ether carboxylic acids corresponding to formula (I) and (II) which are free from propylene oxide groups. Thus, in preferred emulsions, the ether carboxylic acid has the general formula (I) or (II), wherein Y=0.

As mentioned above, the ester comprised in the emulsion of the invention as first additive is based on an ether carboxylic acid and an alcohol. In preferred embodiments of the emulsion of the invention said alcohol (preferably a monool) is alkoxylated and preferably ethoxylated and/or propoxylated.

In particularly preferred embodiments, the alcohol is selected from the group of alcohols consisting of:

a diol, a polyol, alkoxylated diol, alkoxylated polyol, optionally alkoxylated HO—$R^2$ (III)

H—$(OCHR^1CH_2)_m(OCH_2—CH_2)_n OR^2$ (IV), and

H—$(OCH_2—CH_2)_n—(OCHR^1CH_2)_m OR^2$ (V);

wherein $R^2$ is a saturated or unsaturated, branched or unbranched alkyl or alkenyl group containing 3 to 22 carbon atoms; most preferably $R^2$ is an unbranched alkyl or alkenyl group;

m is 0 or a number from 1 to 20; and n is 0 or a number from 1 to 20;

with the proviso that the sum of m and n is not more than 25; and wherein said monool (III), said diol and said polyol is preferably alkoxylated and more preferably ethoxylated and/or propoxylated. In a particularly preferred embodiment, said alcohol is alkoxylated (e.g. ethoxylated and/or propoxylated) oleyl alcohol. In a further preferred embodiment the alcohol is an ethoxylated $C_8$-$C_{20}$ alcohol.

In a further preferred embodiment of the emulsion of the invention, Y=0 and/or m=0, prerably Y=0 and m=0.

Also preferred is an emulsion according to the invention that comprises an ester based on said ether carboxylic acid where X is a number between 1 and 15 and preferably between 2 and 5.

The alcohol used for the ester of the invention preferably has the general formula (III), (IV) or (V) as set out herein above and below, where n is a number between 1 and 15 and preferably between 2 and 5.

Further preferred embodiments of the ester (c) of the emulsion of the invention are based on the ether carboxylic acids and alcohols listed in the following table:

TABLE 1

| Embodiment | Ether carboxylic acid | Alcohol |
|---|---|---|
| 1 | any ether carboxylic acid | general formula (III) or (IV) with m = 0 |
| 3 | any ether carboxylic acid | general formula (IV) with m = 0 and n is between 1 and 5 |
| 4 | general formula (I), wherein Y = 0 | any alcohol |
| 5 | general formula (I), wherein Y = 0 and X is between 1 and 5 | any alcohol |
| 6 | general formula (I), wherein Y = 0 | general formula (III) or (IV) with m = 0 |
| 7 | general formula (I) or (II), wherein X is between 1 and 5 | general formula (IV) or (V) wherein n is between 1 and 5 |
| 8 | general formula (I), wherein Y = 0 and X is between 1 and 5 | general formula (IV) wherein m = 0 and n is between 1 and 5 |
| 9 | general formula (I), wherein Y = 0 and X is 2 | general formula (IV) wherein m = 0 and n is 2 |
| 10 | any ether carboxylic acid | optionally alkoxylated monool |
| 11 | general formula (I), wherein Y = 0 | optionally alkoxylated monool |
| 12 | general formula (I), wherein Y = 0 and X is between 1 and 5 | optionally alkoxylated monool |
| 13 | any ether carboxylic acid | optionally alkoxylated diol |
| 14 | general formula (I), wherein Y = 0 | optionally alkoxylated diol |
| 15 | general formula (I), wherein Y = 0 and X is between 1 and 5 | optionally alkoxylated diol |
| 16 | any ether carboxylic acid | optionally alkoxylated polyol |
| 17 | general formula (I), wherein Y = 0 | optionally alkoxylated polyol |
| 18 | general formula (I), wherein Y = 0 and X is between 1 and 5 | optionally alkoxylated polyol |

Also preferred are emulsions of the invention where the ester is any one according to embodiment 1 to 18 (i.e. embodiment 1, 2, 3, 4, 5, 6, 7, 8, 9, 10, 11, 12, 13, 14, 15, 16, 17 or 18) as shown in table 1 above and wherein the emulsion is a water-in-oil emulsion.

In further preferred embodiments of the emulsion of the invention the ester in (c) is any one according to embodiment 1 to 18 (i.e. embodiment 1, 2, 3, 4, 5, 6, 7, 8, 9, 10, 11, 12, 13, 14, 15, 16, 17 or 18) as shown in table 1 above and wherein the emulsion is a water-in-oil emulsion and wherein the first additive is present in an amount of 0.1 to 10 wt.-% based on the total weight of the emulsion.

In further preferred embodiments of the emulsion of the invention the ester in (c) is any one according to embodiment 1 to 18 (i.e. embodiment 1, 2, 3, 4, 5, 6, 7, 8, 9, 10, 11, 12, 13, 14, 15, 16, 17 or 18) as shown in table 1 above, wherein the emulsion is a water-in-oil emulsion and wherein the first additive is present in an amount of 0.1 to 5 wt.-% based on the total weight of the emulsion.

Additional preferred embodiments of the emulsion of the invention comprise an ester (c) according to embodiment 1 to 18 (i.e. embodiment 1, 2, 3, 4, 5, 6, 7, 8, 9, 10, 11, 12, 13, 14, 15, 16, 17 or 18) as shown in table 1 above and wherein the first additive is present in an amount of 0.1 to 5 wt.-% based on the total weight of the emulsion and wherein the emulsion comprises not more than 45 vol.-% of water based on the total volume of the emulsion.

In further preferred embodiments of the emulsion of the invention the ester in (c) is any one according to embodiment 1 to 18 (i.e. embodiment 1, 2, 3, 4, 5, 6, 7, 8, 9, 10, 11, 12, 13, 14, 15, 16, 17 or 18) as shown in table 1 above and wherein the emulsion is an oil-in-water emulsion.

Further preferred emulsions of the invention comprise as first additive an ester as defined herein and preferably as defined in any of embodiment 1 to 18 (i.e. embodiment 1, 2, 3, 4, 5, 6, 7, 8, 9, 10, 11, 12, 13, 14, 15, 16, 17 or 18) as shown in table 1 above, wherein the ratio between the weight of said first additive comprised in the emulsion and the total weight of all ether carbonic acids comprised in the emulsion is at least 0.1:100 or greater (e.g. 0.1 g ester and 100 g ether carbonic acids or 0.2 g ester and 200 g ether carbonic acids). As mentioned this embodiment includes also greater ratios than 0.1:100 such as e.g. 100:100 (e.g. 2 ether carbonic ester and 2 g ether carbonic acids).

Further preferred emulsions of the invention comprise as first additive an ester as defined herein and preferably as defined in any of embodiment 1 to 18 (i.e. embodiment 1, 2, 3, 4, 5, 6, 7, 8, 9, 10, 11, 12, 13, 14, 15, 16, 17 or 18) as shown in table 1 above, wherein the ratio between the weight of said first additive comprised in the emulsion and the total weight of all ether carbonic acids comprised in the emulsion is at least 5:100 or greater.

Further preferred emulsions of the invention comprise as first additive an ester as defined herein and preferably as defined in any of embodiment 1 to 18 (i.e. embodiment 1, 2, 3, 4, 5, 6, 7, 8, 9, 10, 11, 12, 13, 14, 15, 16, 17 or 18) as shown in table 1 above, wherein the ratio between the weight of said first additive comprised in the emulsion and the total weight of all ether carbonic acids comprised in the emulsion is at least 10:100 or greater.

Further preferred emulsions of the invention comprise as first additive an ester as defined herein and preferably as defined in any of embodiment 1 to 18 (i.e. embodiment 1, 2, 3, 4, 5, 6, 7, 8, 9, 10, 11, 12, 13, 14, 15, 16, 17 or 18) as shown in table 1 above, wherein the ratio between the weight of said first additive comprised in the emulsion and the total weight of all ether carbonic acids comprised in the emulsion is at least 25:100 or greater.

Further preferred emulsions of the invention comprise as first additive an ester as defined herein and preferably as defined in any of embodiment 1 to 18 (i.e. embodiment 1, 2, 3, 4, 5, 6, 7, 8, 9, 10, 11, 12, 13, 14, 15, 16, 17 or 18) as shown in table 1 above, wherein the ratio between the weight of said first additive comprised in the emulsion and the total weight of all ether carbonic acids comprised in the emulsion is at least 50:100 or greater.

In one preferred embodiment the emulsion of the invention does not comprise any ether carbonic acids.

The organic phase used in the emulsion of the invention is generally immiscible with water. Preferably, the organic phase (a) of an emulsion of the invention comprises one or more compound selected from the group consisting of
(i) a carboxylic fatty acid ester of formula: R'—COO—R" (VI) which is different from the ester in (c);
  where R' is a saturated or unsaturated alkyl group containing 5 to 23 carbon atoms and R" is an alkyl group containing 1 to 22 carbon atoms, which may be saturated or unsaturated, linear or branched;
(ii) an α-olefin, an internal olefin, a poly-α-olefin, or combinations thereof;
(iii) a water-insoluble, symmetrical or nonsymmetrical ether of a monohydric alcohols of natural or synthetic origin, which contain 1 to 24 carbon atoms;
(iv) a water-insoluble alcohol of formula: R'''—OH (VII), where R''' is a saturated, unsaturated, linear or branched alkyl group containing 8 to 24 carbon atoms;
(v) a carbonic acid diester;
(vi) a paraffin; and
(vii) an acetal.

In a particularly preferred embodiment the organic phase may comprise an ester described in EP 0 374 672 or EP 0 386 636. In another particularly preferred embodiment of the emulsion of the invention, the emulsion is an invert drilling fluid and the ester (c) is an ester of formula (I) or (II) wherein the organic phase contains esters of formula (VI), in which R' is an alkyl group containing 5 to 21 carbon atoms, preferably 5 to 17 carbon atoms and more particularly 11 to 17 carbon atoms. Particularly suitable alcohols in such organic phase esters (VI) are based on branched or unbranched alcohols containing 1 to 8 carbon atoms, for example on methanol, isopropanol, isobutanol or 2-ethylhexanol. Alcohols containing 12 to 18 carbon atoms are also preferred. Particularly preferred esters that can be used in (VI) of the emulsion are saturated $C_{12-14}$ fatty acid esters or unsaturated $C_{16-18}$ fatty acids with isopropyl, isobutyl or 2-ethylhexanol as the alcohol component. 2-Ethylhexyl octanoate is also suitable. Other suitable esters (VI) are acetic acid esters, particularly acetates of $C_{8-18}$ fatty alcohols. If a branched ester is used in option (i) of the organic phase above, branched esters disclosed in WO 99/33932 or in EP 0 642 561 are suitable and are preferably used. Mixtures of the aforementioned preferred esters in the organic phase (a) of the emulsion are also preferred.

As mentioned above as option (ii) also olefins can be used in the organic phase of the emulsion of the invention. Preferred olefins are described in EP-A-0 765 368. In another preferred embodiment, the oil phase of the emulsion of the invention contains α-olefins or internal olefins (IOs) or poly-α-olefins (PAOs) as organic phase. The IOs or IO mixtures present in the organic phase can then contain between 12 and 30 carbon atoms, preferably 14 to 24 carbon atoms and more particularly up to 20 carbon atoms. If α-olefins are present as the oil phase, α-olefins based on fatty acids containing 12 to 18 carbon atoms are preferably used, saturated α-olefins being particularly preferred. For example, compounds disclosed in EP 0 765 368 A1 can be used.

The emulsion according to the invention preferably comprises at least one further additive selected from the group consisting of a thickener, a fluid loss additive, a wetting agent, a fine-particle weighting agent, a salt, an alkali reserve, a biocide, a thinner, a dispersant, an emulsifier and a surfactant; wherein said further additive is different from said first and second additive.

In practice, hydrophobicized lignite may in particular be used as a fluid loss additive and, hence, in particular to form a dense coating in the form of a substantially liquid-impermeable film on the walls of the well. Suitable quantities are, for example, about 5 to 20 lb/bbl, preferably 5 to 10 lb/bbl and more particularly 5 to 8% by weight, based on the oil phase.

If a thickener is used in the emulsion of the invention the thickener may be a cationically modified fine-particle bentonite (or any other thickener such as a synthetic thickener), whereby the thickener may be used in particular in quantities of about 8 to 10 and preferably 2 to 5 lb/bbl or in the range from 1 to 4% by weight, based on organic phase. The weighting agent normally used to establish the necessary pressure equilibrium is barite (BaSO4), of which the quantities added are adapted to the particular conditions to be expected in the well. For example, the specific gravity of the drilling fluid can be increased by addition of barite to values of up to about 2.5 and preferably in the range from about 1.3 to 1.6. Other suitable weighting agents include calcium carbonate, manganese oxide, water-soluble weighting agents, salts (such as calcium bromide, caesium formiate and others).

In a further preferred embodiment of the emulsion according to the invention the total weight of the first and second additive is between 0.1 to 25% of the weight of the emulsion and preferably between 0.1 to 5% of the weight of the emulsion. Also preferred is an emulsion according to the invention, wherein the total weight of the first and second additive is between 0.1 to 15% of the weight of the organic phase.

A further preferred embodiment relates to an emulsion of the invention, wherein the first and/or second additive each comprises between 16 and 90 carbon atoms and more preferably between 16 and 90 carbon atoms.

As mentioned, the ester (c) optionally together with the ether carboxylic acid (d) as defined herein can be used to prepare emulsions which have improved filtrate properties and stable rheological properties even in a wide range of temperature. It was further shown, that the ester also functions as emulsifier, anti foaming agent and as thickening agent.

Thus, a second aspect of the invention concerns the use of an ester as defined in (c) above as emulsifier viscosifier, anti-foaming agent and/or as thickening agent.

In a preferred use of the invention said ester is used in an emulsion as defined herein which can be a drilling fluid (such as oil- or gas-drilling fluid or a drilling fluid used to exploit geothermal activity) and/or a metalworking fluid.

The use of the ether carboxylic acid esters according to the invention leads on the one hand to stable emulsions and, on the other hand, to an improvement in the filtrate values of the drilling systems. In addition, the rheology of the drilling fluid is positively influenced. It can be of advantage to use the ether carboxylic acid ester according to the present invention as sole emulsifier in drilling fluid systems (preferably in invert drilling fluids). However, the ether carboxylic acid ester of the invention can also be combined with ether carboxylic acids or further emulsifiers such as an emulsifier selected from the group consisting of an ether carboxylic acid, a fatty acid amine, an amidoamine, a fatty alcohol ethoxylate, a fatty acid ethoxylate, an alkylpolyglycoside and a fatty alcohol. Emulsifiers capable of forming water in oil emulsions are preferred as further emulsifiers for this purpose.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be covered by the present invention.

The following examples are merely illustrative of the present invention and should not be construed to limit the scope of the invention as indicated by the appended claims in any way.

EXAMPLES

Example 1

Production of Water-in-Oil Drilling Fluid

To test the technical teaching disclosed here, drilling fluids with the following general composition were prepared:

| Ingredient/Property | Amount (gram) |
|---|---|
| XP 07 (paraffin) | 129 |
| CMC 392 (oleic acid) | 2 |
| Additive A or B | 13 |
| Rheology modifier (e.g. modified organophilic bentonite, Gelstone II (Baroid)) | 10 |
| Water | 43 |
| Calcium chloride (75%) | 27 |
| Barite | 443 |
| Weight | 1.9 lb/gal |
| Salinity | 250000 ppm |
| Oil/water ratio | 80/20 |

The constituents were mixed in the following order: XP 07, OMC 392, additive A (comparative example) or B (according to the invention), rheology modifier, water, calcium chloride and barite to result in two Oil Mud Systems A and B, respectively. To obtain a suitable emulsion the mixing can be carried out using typical mixers well known in the art such as a Hamilton Beach or a Silverston mixer, following manufacturer's instructions.

Additive A and additive B had the composition as outlined in the following table:

| Additive A | Additive B |
|---|---|
| Ether carboxylic acid according to formula (I), wherein $X = 2$, $y = 0$, $Z = H$ and $R =$ unsubstituted $C_{18}$ alkenyl | Ester based on (i) an alcohol according to formula IV, wherein $R^2 = C_{18}$ alkenyl, $n = 2$ and $m = 0$; and (ii) an ether carboxylic acid according to formula (I), wherein $X = 2$, $y = 0$, $Z = H$ and $R =$ unsubstituted $C_{18}$ alkenyl |

Ester B as defined in the above table can be prepared using routine ester production methods for example by esterification of 1 mol ethercarboxylic acid using 1 mol of the alcohol alkoxylate.

Example 2

Determining Product Characteristics

Next, the rheological characteristics including the fluids-plastic viscosity (PV), yield point (YP) and gel strength (gels 10"/10') after 10 seconds and 10 minutes were determined with a Fann SR 12 rheometer (Fann) for system A and B. In addition to the rheological characteristics, the filtrate values were also determined using a Fann HTHP (high-temperature, high-pressure) filter press according to manufacturer's instructions using 600 psi and a temperature of 177° C. (350° C.).

The drilling fluid of system A and B was also tested in a Roller Oven for 16 hours at temperatures of 177° C. (350° F.) (after hot rolling=AHR and before hot rolling=BHR in the Table). All results are set out in the following table:

| System | A | | B | |
|---|---|---|---|---|
|  | BHR | AHR | BHR | AHR |
| Hours rolled/aged |  | 16 |  | 16 |

-continued

| System | A | | B | |
|---|---|---|---|---|
| | BHR | AHR | BHR | AHR |
| Hot roll temp. (° F.) | | 350 | | 350 |
| Static age temp. (° F.) | — | | — | |
| 600 rpm (skt) | 83 | 126 | 101 | 152 |
| 300 rpm | 45 | 71 | 61 | 88 |
| 200 rpm | 32 | 52 | 47 | 64 |
| 100 rpm | 19 | 30 | 31 | 39 |
| 6 rpm | 4 | 6 | 10 | 8 |
| 3 rpm | 3 | 5 | 9 | 6 |
| PV (cP) | 38 | 55 | 40 | 64 |
| YP (lb/100 ft$^2$) | 7 | 16 | 21 | 24 |
| Gels 10"/10' (lb/100 ft$^2$) | 4/8 | 6/7 | 10/11 | 7/8 |
| HTHP total (ml) | | 6 | | 6 |
| HTHP water/ emulsion (ml) | | — | | — |
| HTHP oil (ml) | | 6 | | 6 |
| HTHP temp. (° F.) | | 350 | | 350 |

It can be seen from the above data that the ether carboxylic acid ester in system (B) shows very good emulsifier properties and that it acts in parallel as a viscosity increaser. In particular it is evident from the yield point data and the reading at 600 rpm that in system B the rheological profile is higher, i.e. that the additive also acts as an emulsifier. Surprisingly, the filtrate values remained the same even though an ester was used as additive B.

Example 3

Production of Metal Working Fluid Concentrate Composition

| Vol. % | Ingredient | function |
|---|---|---|
| 50 | 2-ethly hexyl oleate | base fluid (ester or mineral oil) |
| 6, 5 | Monoethanolamine | corrosion protection |
| 2, 5 | Triethanolamine | corrosion protection |
| 14, 8 | Oleic acid | corrosion protection/emulsifier |
| 4 | Octanoic acid | corrosion protection/emulsifier |
| 10, 6 | Oleyl alcohole + 2 EO | emulsifier |
| 4, 9 | Oleyl alcohole + 5 EO | emulsifier |
| 4 | Additive A or Additive B | emulsifier |
| 2, 7 | Butyldiglycol | solubiliser |

The above outlined metal working fluid concentrate composition was prepared. Additive A and Additive B are compositions as outlined above in example 1.

In a first experiment the emulsifying properties of Additive A and B were compared. For this, an emulsion of water comprising 5 vol.-% of the above outlined metal working fluid concentrate composition was prepared by mixing the composition into water. To measure the emulsion difference, a 1% metalworking fluid concentrate solution in water was prepared and turbidity was measured with a 2100N IS Turbidimeter (HACH).

The results are shown in the following table:

| metalworking fluid (1%) | turbidity in NTU at 20° C. |
|---|---|
| A | 825 |
| B | 731 |

As observed, the use of Additive B increased the transparency of the solution which is an indication of an improved emulsion, i.e. the oil droplets are smaller in size when using additive B.

In a second experiment the anti-foaming properties of Additive A and Additive B were compared.

For this, 95 ml of water and 5 ml of the above outlined metal working fluid concentrate composition comprising either Additive A or B was mixed by vigorous shaking for one minute in a transparent measuring cylinder. Thereafter, the thickness of the foam layer was determined after 1, 2, 3, 4, 5 and after 10 minutes.

The use of Additive B showed a significantly faster foam reduction than when adding Additive A instead.

The invention claimed is:

1. An emulsion, including a drilling fluid or metal working fluid, wherein the emulsion comprises at least the following components:

(a) an organic phase;

(b) a water phase;

(c) as first additive, an ester based on an ether carboxylic acid and an alcohol wherein the ether carboxylic acid and/or said alcohol is alkoxylated, wherein the emulsion is a water-in-oil emulsion; and (d) as second additive, an emulsifier which is different from the first additive and which is selected from the group consisting of an ether carboxylic acid, a fatty acid amine, an amidoamine, a fatty alcohol ethoxylate, a fatty acid ethoxylate, an alkylpolyglycoside and a fatty alcohol wherein the emulsion has a specific gravity of from 1.3 to 2.5.

2. The emulsion of claim 1, wherein the emulsifier of component (d) is an ether carboxylic acid.

3. The emulsion according to claim 1, wherein the ether carboxylic acid in (c) and/or (d) is alkoxylated whereby said ether carboxylic acid is ethoxylated and/or propoxylated.

4. The emulsion according to claim 1, wherein the ether carboxylic acid is a compound having the general formula (I) or (II)

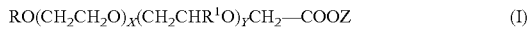

$$RO(CH_2CH_2O)_X(CH_2CHR^1O)_YCH_2-COOZ \quad (I)$$

or

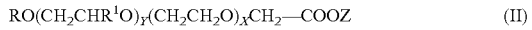

$$RO(CH_2CHR^1O)_Y(CH_2CH_2O)_XCH_2-COOZ \quad (II)$$

wherein

R is a branched or unbranched $C_6$-$C_{50}$ alkyl which may be optionally alkoxylated or substituted with one or more —COOZ substituent or R is a branched or unbranched $C_6$-$C_{50}$ alkenyl which may be optionally alkoxylated or substituted with one or more —COOZ substituent;

X is 0 or a number from 1 to 20;

Y is 0 or a number from 1 to 20;

with the proviso that the sum of X and Y is not more than 25;

$R^1$ is an alkyl group with 1 to 4 carbon atoms; and

Z comprises at least one member selected from the group consisting of a hydrogen atom, a monovalent cation and a polyvalent cation.

5. The emulsion according to claim 4, wherein the emulsion comprises more than 60 vol-% of organic phase based on the volume of the drilling fluid or metal working fluid.

6. The emulsion according to claim 4, wherein Y=0.

7. The emulsion according to claim 4, wherein X is a number between 1 and 15.

8. The emulsion according to claim 4, wherein X is a number between 1 and 5.

9. The emulsion according to claim 1, wherein said alcohol is alkoxylated.

10. The emulsion according to claim 1, wherein said alcohol is ethoxylated and/or propoxylated.

11. The emulsion according to claim 1, wherein said alcohol is selected from the group of alcohols consisting of:
a diol,
a polyol,
alkoxylated diol, alkoxylated polyol, optionally alkoxylated HO—$R^2$ (III), $$H—(OCHR^1CH_2)_m(OCH_2—CH_2)_nOR^2 \quad (IV),$$

and $$H—(OCH_2—CH_2)_n—(OCHR^1CH_2)_mOR^2; \quad (V);$$

wherein
$R^2$ is a saturated or unsaturated, branched or unbranched alkyl or alkenyl group containing 6 to 22 carbon atoms;
m is 0 or a number from 1 to 20; and
n is 0 or a number from 1 to 20;
with the proviso that the sum of m and n is not more than 25.

12. The emulsion according to claim 11, wherein n is a number between 1 and 15.

13. The emulsion according to claim 11, wherein m=0.

14. The emulsion according to claim 1, wherein the organic phase comprises one or more compound selected from the group consisting of (i) a carboxylic acid ester of formula: R'—COO—R" (III);
where R' is a saturated or unsaturated, linear or branched alkyl group containing 5 to 23 carbon atoms and R" is an alkyl group containing 1 to 22 carbon atoms, which may be saturated or unsaturated, linear or branched;
(ii) an α-olefin, an internal olefin, a poly-α-olefin, or combinations thereof;
(iii) a water-insoluble, symmetrical or nonsymmetrical ether of a monohydric alcohols of natural or synthetic origin, which contain 1 to 24 carbon atoms;
(iv) a water-insoluble alcohol of formula: R'"—OH (IV), where R'" is a saturated, unsaturated, linear or branched alkyl group containing 8 to 24 carbon atoms;
(v) a carbonic acid diester;
(vi) a paraffin; and
(vii) an acetal.

15. The emulsion according to claim 1, wherein the drilling fluid or metal working fluid comprises at least one further additive selected from the group consisting of a thickener, a fluid loss additive, a wetting agent, a fine-particle weighting agent, a salt, an alkali reserve, a thinner, a dispersant, an emulsifier and a surfactant; wherein said further additive is different from said first and second additive.

16. The emulsion according to claim 1, wherein the total weight of the first and second additive is between 0.1 to 25% of the weight of the drilling fluid or metal working fluid.

17. The emulsion according to claim 1, wherein the first and/or second additive comprises between 16 and 90 carbon atoms.

18. The emulsion according to claim 1, which comprises a water phase containing electrolytes to equalize the osmotic gradient between the drilling fluid and the formation water.

19. The emulsion according to claim 1, wherein the emulsion has a specific gravity of from 1.3 to 1.6.

* * * * *